(12) United States Patent
Grahn

(10) Patent No.: US 12,251,825 B2
(45) Date of Patent: Mar. 18, 2025

(54) DEMOLITION ROBOT WITH CONTROL AND MONITORING FUNCTION TO AVOID THERMAL DAMAGE TO A MOTOR COMPRISED IN THE DEMOLITION ROBOT

(71) Applicant: BROKK AKTIEBOLAG, Skellefteå (SE)

(72) Inventor: Johan Grahn, Skelleftehamn (SE)

(73) Assignee: BROKK AKTIEBOLAG, Skellefteå (SE)

( * ) Notice: Subject to any disclaimer, the term of this patent is extended or adjusted under 35 U.S.C. 154(b) by 442 days.

(21) Appl. No.: 17/753,819

(22) PCT Filed: Sep. 15, 2020

(86) PCT No.: PCT/SE2020/050859
§ 371 (c)(1),
(2) Date: Mar. 15, 2022

(87) PCT Pub. No.: WO2021/054884
PCT Pub. Date: Mar. 25, 2021

(65) Prior Publication Data
US 2022/0339777 A1      Oct. 27, 2022

(30) Foreign Application Priority Data

Sep. 19, 2019   (SE) .................................. 1951059-3

(51) Int. Cl.
*H02P 29/60*      (2016.01)
*B25J 5/00*       (2006.01)
(Continued)

(52) U.S. Cl.
CPC ............. *B25J 5/005* (2013.01); *B25J 13/087* (2013.01); *B60L 1/003* (2013.01); *E04G 23/082* (2013.01)

(58) Field of Classification Search
CPC .......... H02P 29/60; G05B 2219/37429; G05B 19/42281; B25J 5/005; B25J 13/087; B60L 1/003
See application file for complete search history.

(56) References Cited

U.S. PATENT DOCUMENTS

2005/0071090 A1   3/2005   Katou
2011/0126533 A1   6/2011   Noll et al.
(Continued)

FOREIGN PATENT DOCUMENTS

BR      P10711434 A2 *  11/2011
CN      101796296 A      8/2010
(Continued)

OTHER PUBLICATIONS

"DXR-310"; Husqvarna Construction Products, downloaded from www.Manualslib.com. Mar. 16, 2009.
(Continued)

*Primary Examiner* — Karen Masih
(74) *Attorney, Agent, or Firm* — Knobbe, Martens, Olson & Bear, LLP

(57) ABSTRACT

The invention relates to a demolition robot (1), comprising a cable (12) intended to be connected to an electric network to power a motor (21), a pump (22) that is powered by the electric motor for generating a hydraulic flow to consumers (13), wherein the motor (21) is activable at varying thermal load values (PT), depending on the current consumer's (13) need for hydraulic power, a control unit (24) arranged to receive information about the thermal load (PT) on the motor, to determine a partial thermal damage value (SL, SM, SH) at various thermal loads (PT) on the motor. To minimize the risk of thermal damage to the motor, the control unit (24) is adapted to compare said partial thermal damage values (SL, SM, SH) with a normative partial thermal damage (A) and is adapted to limit the thermal load (PT) on the motor (Continued)

Figure 1:
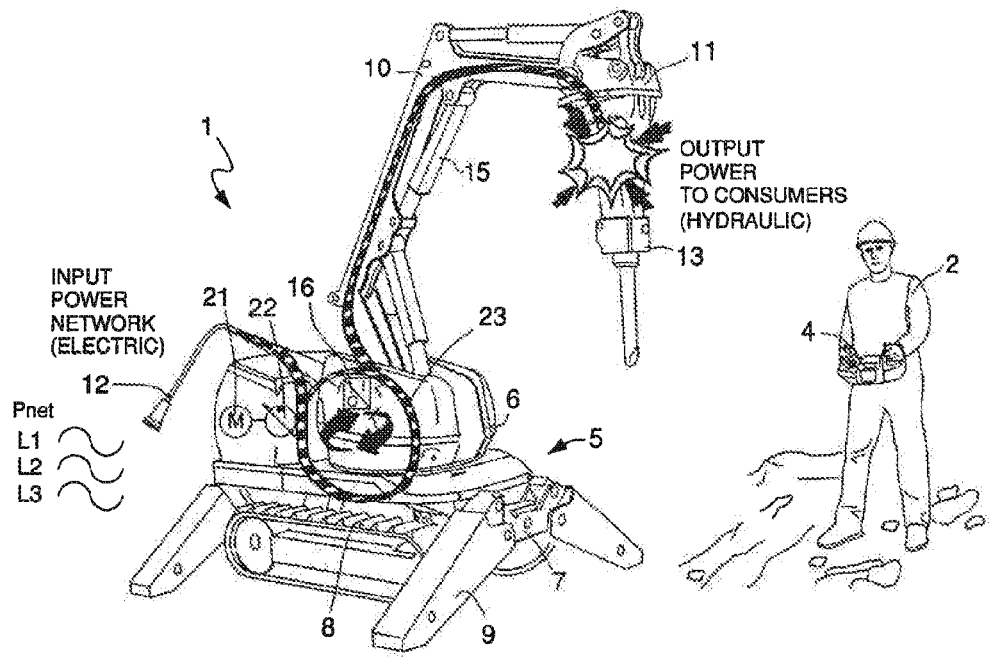

(21) to a maximum allowable thermal load value (PTmax), if the partial thermal damage value (SL, SM, SH) exceeds the normative partial thermal damage (A) at a predetermined value (A').

10 Claims, 4 Drawing Sheets

(51) Int. Cl.
*B25J 13/08* (2006.01)
*B60L 1/00* (2006.01)
*E04G 23/08* (2006.01)

(56) References Cited

U.S. PATENT DOCUMENTS

| | | |
|---|---|---|
| 2012/0090807 A1 | 4/2012 | Stewart et al. |
| 2013/0030661 A1 | 1/2013 | Opperman |
| 2019/0249394 A1 | 8/2019 | Mehra et al. |

FOREIGN PATENT DOCUMENTS

| | | | |
|---|---|---|---|
| CN | 102094380 A | 6/2011 | |
| CN | 103134675 A | 6/2013 | |
| CN | 104832464 A | 8/2015 | |
| GB | 2253957 A | 9/1992 | |
| SE | 529874 C2 | 12/2007 | |
| WO | 2007/133157 A1 | 11/2007 | |
| WO | 2010/099986 A2 | 9/2010 | |
| WO | 2019/164440 A1 | 8/2019 | |
| WO | WO-2024068871 A1 * | 4/2024 | ............ E02F 9/2228 |

OTHER PUBLICATIONS

"Product Manual for ACS Gen 6, Motor Controller"; inmotion Technologies AB (2014).
International Search Report for International Application No. PCT/SE2020/050859, dated Feb. 10, 2020 in 4 pages.
Extended European Search Report issued in the corresponding European Patent Application No. 20865706.4, dated Sep. 4, 2023 in 11 pages.
Chinese Office Action issued in Chinese Patent Application No. 202080065189.6, issued Dec. 25, 2023 (16 pages).

* cited by examiner

DEMOLITION ROBOT WITH CONTROL AND MONITORING FUNCTION TO AVOID THERMAL DAMAGE TO A MOTOR COMPRISED IN THE DEMOLITION ROBOT

CROSS-REFERENCE TO RELATED APPLICATIONS

This application is the U.S. National Phase under 35. U.S.C. § 371 of International Application PCT/SE2020/050859, filed Sep. 15, 2020, which claims priority to Swedish Patent Application No. 1951059-3, filed Sep. 19, 2019.

TECHNICAL FIELD

The present invention relates to a demolition robot, in which an electric motor is installed and powers a load in the form of a hydraulic pump, which through so-called power regulation can supply hydraulic flow with variable hydraulic output power to the consumers of the demolition robot. In the demolition a control and monitoring function is included, preventing the demolition robot from being used in a manner that may result in thermal damage to the electric motor of the demolition robot.

BACKGROUND OF THE INVENTION

Energy supply or input power for a demolition robot is usually constituted by current, which is obtained from a conventional three-phase electricity distribution network on site. The demolition robot is supplied with electrical energy via a cable, which is connected to suitable outlets in the electricity distribution network. The demolition robot has an electric motor and a three-phase installation, which provides input power for the motor. The motor, which can be of the three-phase low-voltage type 380-500 V and frequency 50 or 50 Hz, powering a load, which substantially comprises a hydraulic pump that via hydraulic valves distributes a hydraulic output power in the form of a flow of hydraulic energy for both the demolition robot's internal consumers, such as hydraulic motors for tracks, or as external consumers, such as a hydraulic motor in a hydraulic tool, such as a chipping hammer. By means of known advanced load-sensing technique "Load Sensing", so-called LS systems, the hydraulic flow can be controlled and regulated as needed for each consumer. The function of LS systems has been well-known for long and is for example described in our patent application SE 1851013-1 simultaneously being processed.

A conventional three-phase network has three phases, which for example can have a voltage of 400 V between the three phases L1, L2 and L3. The voltage between phase and neutral conductor 0 is in the exemplary case usually 230 V. At each electric installation, the aim is to distribute the single-phase loads 230 V, so that they are equal between each zero and phase. At equal loading, the current will also be distributed equally between the loads and the zero will remain without current. However, in conventional three-phase networks, which also service single-phase devices, and wherein the networks can be sub-standard for other reasons, significant imbalance of the electrical energy that circulates in the particular phases L1, L2, L3 may occur. It can be imbalances between particular phases or at worst absence of any phase. As a result, the three-phase network will not be able to supply the motor of the demolition robot with the required input power, which, due to a limited number of functioning phases implies that the motor is forced to work with electric current in the active phases and thus often can exceed the rated load of the motor, which may result in an extreme temperature increase in the motor that could damage the motor. This means causing a so-called partial thermal damage, which limits the lifetime of the motor. Overall, recurring partial thermal damage to the motor will result in an accumulated thermal damage, which substantially will affect the lifetime of the motor, result in damage or wreckage.

Such state of extreme overheating of motors is usually called "thermal overload". Uncontrollably high operating temperatures in the motor can be avoided by monitoring the size of the phase current and by switching off the current in the cases when the starting times become unreasonably long. To prevent damage, modern motors are equipped with a so-called motor-circuit switch, which usually temporarily disconnects the supply voltage of the motor at thermal overload. Other conditions that may lead to overheating can be overloading of the motor, engine stalling, high ambient temperature, inadequate motor ventilation, tight starter, high or low voltage/frequency mechanical error on the load powered by the motor etc. In this context, it should be understood than detecting imbalances between particular phases in a three-phase installation alone is substantial, but not sufficient to disclose all potential errors that may result in overheating, for example in the case that the overheating is caused by inadequate motor ventilation.

Moreover, there is a need for making it possible for a more general user, for instance a constructor or a technician at a machine manufacturer, via remote diagnostics to better understand the operating working condition of a demolition robot, in particular in respect of the risk of thermal motor damage that may arise during work. Usually, error search in the case of thermal damage is difficult and time-consuming for a technician to localize or diagnose. Very rarely can an operator of the demolition robot in the field user account for an entire causal connection, i.e. "cause/effect" towards the technician. The operator can usually describe the "effect", i.e. that the machine behaves in an unexpected way, suddenly stops due to the motor-circuit switch being triggered and that the motor tends to run hot or the like, but unfortunately the operator can rarely submit information about the cause itself of a sudden change in the operating working condition of the machine. In this situation, questions about warranties may also arise as well as questions about whether the demolition robot is used in the correct manner in case of damage. In order to redress the problem outlined above to the greatest extent possible, there is a need to achieve a demolition robot with improved possibilities of controlling and monitoring the operating condition of the motor to be able to avoid thermal damage to the motor and hence shortening of its lifetime.

SUMMARY OF THE INVENTION

The object of the present invention is thus to achieve a demolition robot with a control and monitoring function, preventing the demolition robot from being used in a manner that may result in thermal damage to the electric motor of the demolition robot and hence shorten its lifetime. Another object of the invention is to facilitate localization and diagnosis in case of overheating of the motor comprised in a demolition robot.

Said object of the invention is achieved by a demolition robot having the features and characteristics state in the present disclosure. Further characteristics and advantages of the invention appear from the dependent claims.

According to the invention, the demolition robot comprises a control unit, which is adapted to compare a current observed partial thermal damage to the motor with a predetermined normative partial thermal damage to a motor, particularly a motor with corresponding operating time in terms of hours (h), whereby the control unit can determine whether the motor thermally has been loaded more severely than can be considered as normal based on a predetermined standard. The value of a partial thermal damage indicates how much each particular partial thermal damage has shortened the expected lifetime of the motor. The control unit also calculates an accumulated partial thermal damage during operation, which constitutes a sum of all partial damages that have arisen. The accumulated partial thermal damage thus constitutes a theoretical estimate of the used lifetime of the motor due to overheating. Knowledge about each partial thermal damage as well as the accumulated partial thermal damage can be used in various ways to limit the risk of thermal overloading of the motor and thereby reduction in the lifetime of the motor. In addition to the value of an accumulated partial thermal damage, a causal connection for the thermal damage and/or the measures that the control unit can have taken to limit the risk of thermal damage can be established. One or a plurality of said tasks can, via a suitable indication means such as a user interface, for example on a monitor (display) on a remote control of the demolition robot, be presented to an operator.

In an embodiment, the control unit is adapted to compare a current observed partial thermal damage to the motor with a predetermined normative partial thermal damage to the motor, which can be but not necessarily is accumulated.

In an embodiment, the control unit is adapted to limit the thermal load on the motor to a maximum allowable load value, if the current partial thermal damage exceeds a normative partial thermal damage, or an accumulated thermal partial damage exceeds a normative accumulated partial thermal damage. The predetermined normative value thus constitutes a measure of how much the motor can thermally be overloaded, before the control unit reduces the thermal load on the motor. The predetermined normative thermal value need not necessarily be a constant value, but it can be a value that varies depending on the operating time in hours (h) of the demolition robot and hence the motor.

As the thermal load on the motor is limited, for example by the amount of hydraulic power supplied by a hydraulic pump connected to the motor to a current consumer being reduced, an operator may experience that the demolition robot's consumer of hydraulic flow, such as for example a hydraulic chipping hammer, works at lower revolution speed and thereby at lower felling capacity than expected. To decrease the operating temperature, the motor can be caused to work at reduced load for a period through power control of the output power of the hydraulic system. In a demolition robot with a hydraulic LS system, power control can take place via deplacement control of the pump, so that the hydraulic flow supplied from the pump is limited, for example until the motor again has reached a normative operating temperature.

In another embodiment, the thermal load on the motor could be limited by a forced stream of some heat-absorbing medium being caused to pass through the motor. It is imaginable that the motor can thereby continue to work at constant load. The required heat-absorbing medium can comprise air that can be generated by a blower, alternatively air that is obtained from a compressed air system with a compressed air tank, which can but not necessarily needs to be on-board the demolition robot.

In an embodiment, the demolition robot comprises an indication means in the form of a display, which is adapted to inform an operator of the demolition robot on occasions when the motor and thereby the consumer of the demolition robot only is capable of being activated up to a maximum allowable load value.

In another embodiment, the demolition robot comprises an indication means, which is adapted to inform an operator not only about the operation, i.e. that the demolition robot can only work at a limited power, but also about the actual causal connection. For example that the possibility of activating the motor and thereby the demolition robot up to a maximum allowable load value is due to limitations/problems such as the absence of any phase current related to the electrical energy feed to the motor. Thereby the operator is made aware of the causal connection and can submit more detailed information to the technician to solve the actual problem that may stem from problems with the electric network on site.

In an embodiment, the control unit of the demolition robot comprises stored information, which renders it possible to estimate the extent of the partial thermal damage caused by various thermal load values on the motor. Such data can be based on the specifications from the motor manufacturer or statistics. The thermal load values on the motor may be divided into at least two different thermal load areas, and each of the load areas has a corresponding partial thermal damage value. The thermal load on the motor can for example be divided into a low-load area, a medium-load area and a high-load area. As the motor during a predetermined measuring period is thermally loaded within one of said load areas, a corresponding partial thermal damage value is obtained. The connection between thermal load on the motor and occurring partial thermal damage can be established in any suitable manner, for example via an applicable mathematical function, so that for each particular thermal load on the motor, a corresponding partial thermal damage value can be calculated.

In another embodiment, the control unit is adapted to receive information from one or a plurality of temperature-sensing elements, which are provided for the motor to sense the motor temperature and thereby determine the thermal load on the motor.

In another embodiment, the demolition robot comprises a pressure sensor alternatively a flow sensor, which is provided to sense the flow power supplied from the pump to the current consumer or consumers of hydraulic flow. It should be understood that the expression LS system implies that the system also comprises pressure-sensing elements for flow control to consumers.

In another embodiment, the demolition robot comprises a power-sensing measurement means for controlling and monitoring the input power to the motor that is tapped from a three-phase network on the site to which the demolition robot is connected. This power-sensing measurement means can comprise a current-sensing element with a current sensor provided for each phase for sensing imbalance between the phases in the electric network or absence of any phase. Alternatively, the measurement means can comprise a voltage-sensing element, which can sense the voltage and possibly also the grid frequency in each phase.

SHORT DESCRIPTION OF DRAWINGS

Figure 2:
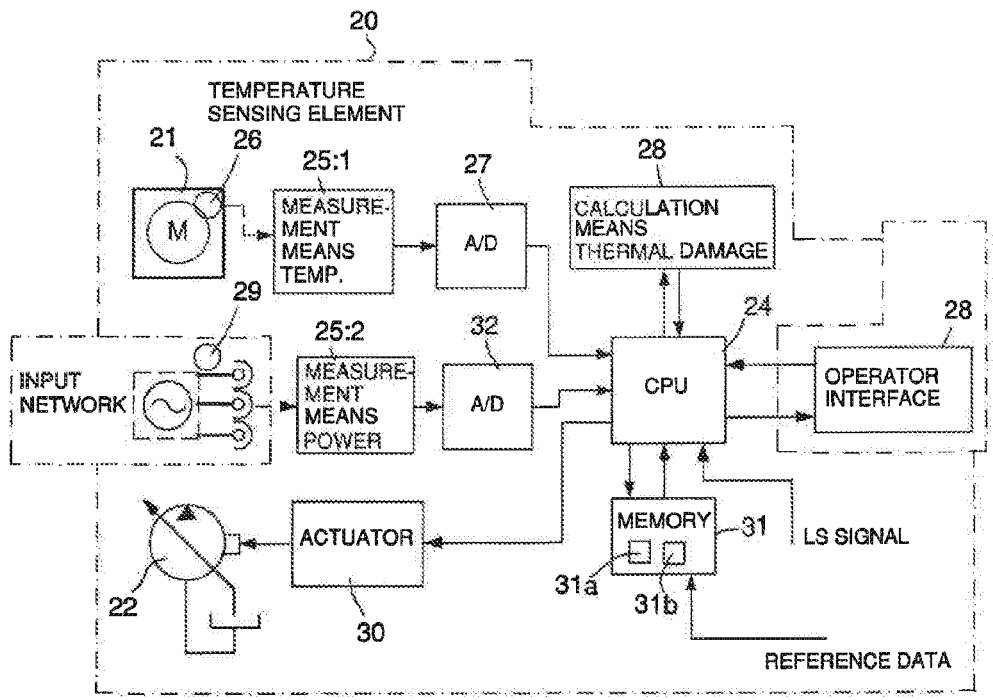
Figures 1A, 1B:
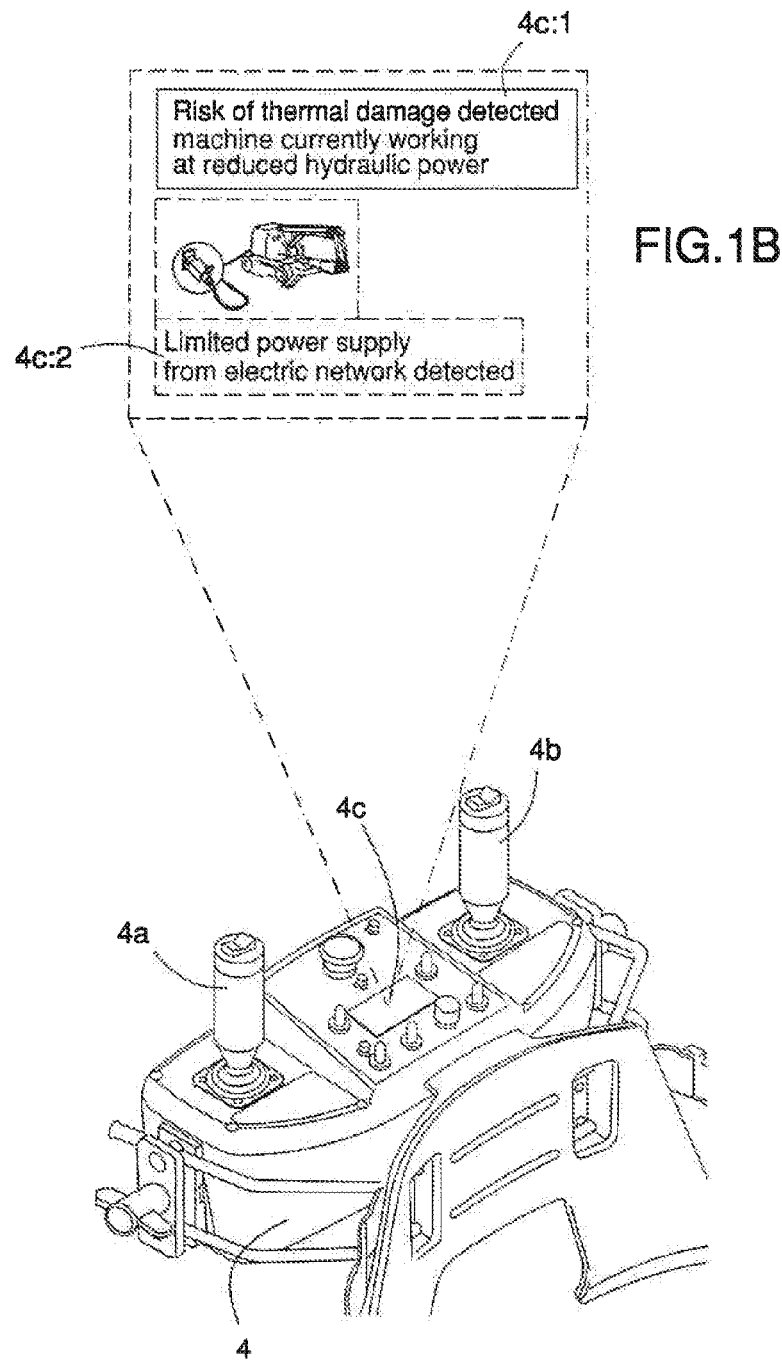
Figure 3A:
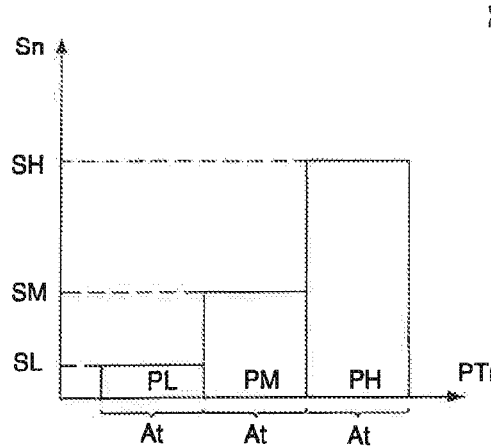
Figure 3B:
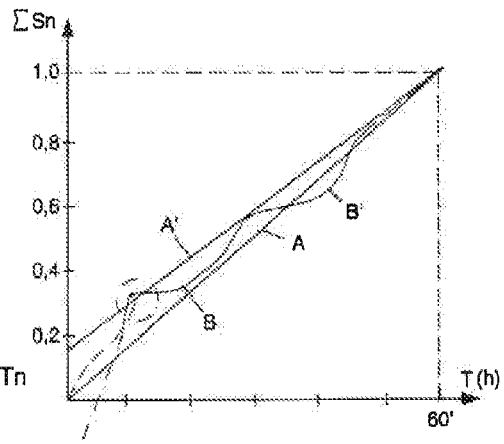
Figure 3C:
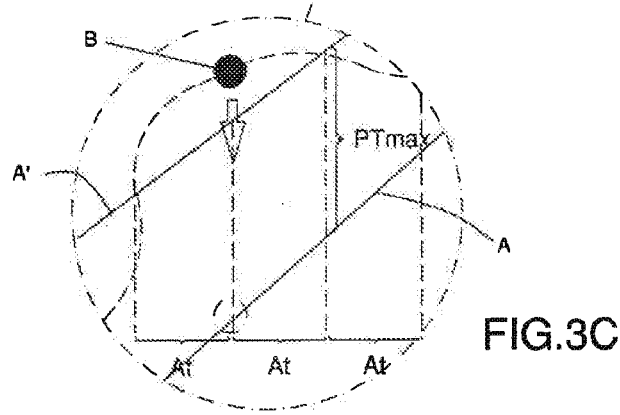
Figures 4A, 4B:
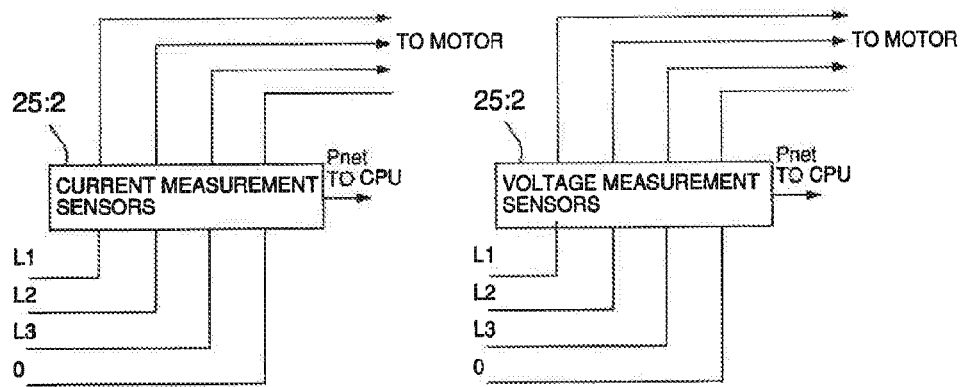
Figure 5:
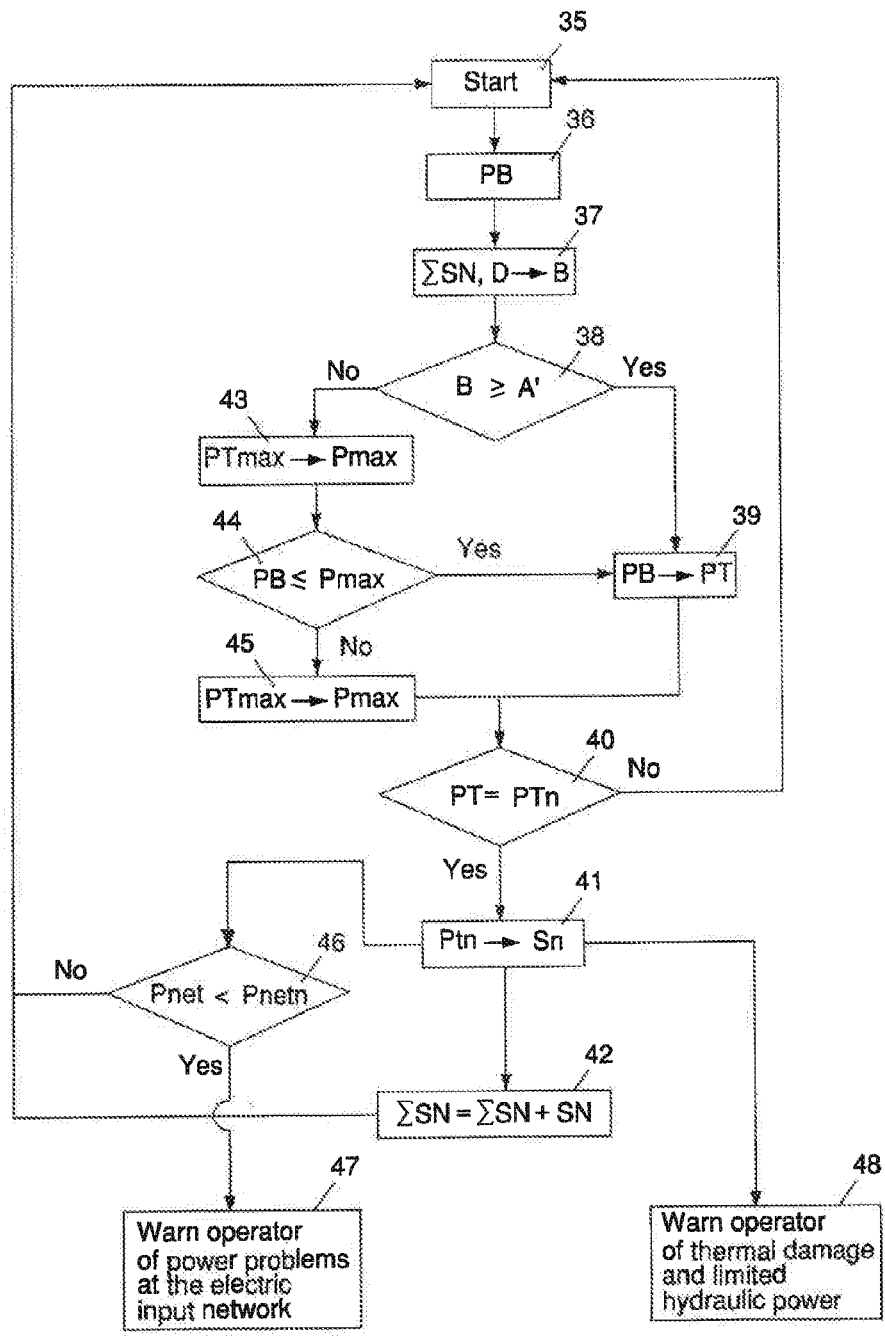

In the following, the invention is described in more detail based on an exemplary embodiment, shown in the accompanying drawing; wherein;

FIG. 1 schematically shows a demolition robot, in which an electric motor is installed, which powers a hydraulic pump to supply hydraulic flow at variable hydraulic power to each consumer included in the demolition robot and in which demolition robot a control and monitoring function is included to avoid thermal damage to the motor according to the present invention, FIG. 1A shows a remote control device included in the demolition robot, which is intended to be carried by an operator, FIG. 1B schematically shows operator information, which by means of graphic user interfaces can describe causes as well as effects of detected thermal damage to the motor of the demolition robot, FIG. 2 schematically shows a block diagram of a propulsion system of a demolition robot, in which a control and monitoring function is included to avoid thermal damage to the motor according to the present invention, FIG. 3A shows an example of how the value of a partial thermal damage can vary at various thermal loads on a motor included in a demolition robot, FIG. 3B shows, as curves by a graph in a diagram, how an accumulated partial thermal damage to a motor can vary with the motor operating time in hours (h), FIG. 3C shows a detailed enlargement of an operating point B of a load PB, depending on an operating mode selected by an operator during an activation period At, and in which enlargement A denotes a normative thermal curve and A' a partial thermal damage-limiting curve with a partial damage value A, FIG. 4A schematically shows a block diagram of a power measurement means with a current sensor provided for each phase in a three-phase system for sensing imbalance between the phases in the comprised electric three-phase network or the absence of any phase, FIG. 4B schematically shows a block diagram of a power measurement means with a voltage-sensing element provided for each phase in a three-phase system for sensing imbalance between the phases in the comprised electric three-phase network or the absence of any phase, FIG. 5 shows a flow chart describing the manner, in which a control and monitoring function works, to avoid thermal damage to the motor, in a demolition robot according to the present invention.

DETAILED DESCRIPTION OF A PREFERRED
EMBODIMENT OF THE INVENTION

FIG. 1 shows a demolition robot 1 in more detail. An operator 2 (machine operator) walks beside the demolition robot 1 and remote-controls it wirelessly via a remote control device 4, comprising a transmitter/receiver unit. A chassis with a carriage having a top carriage 6 and an undercarriage 7 is generally denoted 5. The top carriage 6 is twistably bedded on the undercarriage 7 for swinging in a horizontal plane. The undercarriage 7 is equipped with a propulsion device comprising tracks 8. Support legs are denoted 9 and are operated by associated hydraulic cylinders, and an operable arm means, denoted 10, is sustained on the top carriage 6 and is operable by means of hydraulic cylinders. A cable is denoted 12 and is intended to be connected to a stationary three-phase electric line network to provide the demolition robot 1 with electric input power in the form of electrical energy. The stationary three-phase line network is indicated by phases L1, L2, L3 in the figure. The arm means 10 is at its free end provided with a tool attachment 11, in which various types of consumers in the form of tools 13 can be arranged and connected for hydraulic operation. The tool 13 can be activated for operation by means of the remote control device 4. Said tool 13 can comprise a hydraulically powered chipping hammer, which is shown in the figure, a rotatable shear blade, a saw or a scoop to mention a few examples. For the sake of simplicity, both said internal and external hydraulically powered units of the demolition robot are designated consumers 13.

As shown in FIG. 1A, the remote control device 4 comprises impact means such as control sticks 4a and buttons 4b, which can be operated by the operator 2 to control and monitor the demolition robot's 1 various functions. Via the remote control device 4, the operator 2 may set the demolition robot 1 in various operating or usage conditions. Depending on the operating mode selected for the demolition robot 1, the impact means will control various functions of the demolition robot 1. The choice of operating mode and other information of importance to the operator 2 can be shown in an indication means in the form of a display unit 4c on the remote control device 4. The arm means 10 comprises, at its ends, a number of articulately joined arm parts, which are mutually moveable by impact of hydraulic cylinders 15. The hydraulic cylinders 15 are controlled by means of a valve block 16 with electro-hydraulically operative valves, which are accommodated in the pivotable part of the top carriage 6 of the demolition robot 1. The hydraulic valve block 16 enables regulating a flow of a hydraulic fluid (oil) to each of the consumers 13 of the demolition robot. In the present case to the chipping hammer 13 that is fastened to the free end of the arm means 10.

The demolition robot 1 is powered by a driving system, which substantially comprises a motor 21 and, powered by this, a hydraulic pump 22 that allows power regulation of the hydraulic output power, which is directed out to the demolition robot's various consumers 13. This possibility of regulating the demolition robot's hydraulic output power relative to the motor's 21 thermal load is illustrated by an energy sling 23, shaped as a loop, line-marked with alternating darker and lighter bands, which travel from the demolition robot's input power inlet 12 (electric network) to the outgoing hydraulic output power outlet that provides the consumer 13 with power. The motor 21 can be of a three-phase low-voltage type 380-500 V and the frequency 50 Hz. The conventional three-phase network can have a voltage of 400 V between the three phases L1, L2 and L3 as illustrated in FIG. 1.

FIG. 2 schematically shows a block diagram of a propulsion system of a demolition robot, in which a control and monitoring function 20 is included to avoid thermal damage to the motor 21 according to the present invention. This control and monitoring function 20 comprises a control unit 24 in the form of a computer (CPU) arranged to receive information about a plurality of operational parameters. More than anything else, it is about measuring and monitoring the thermal load PT on the motor 21 and characteristics of the input power, which via the cable 12 is taken from a three-phase network on site to provide the motor 21 with current.

A temperature-sensing first measurement means 25:1 is coupled to an exemplified thermal sensing element 26, which is arranged for measuring an operational parameter in the form of current temperature (operating temperature) on at least one point in the motor 21. Between the thermal measurement means 26 and the control unit 24, an A/D converter 27 is coupled. The system further comprises a means 28 operatively coupled to the control unit 24 for calculation of thermal damage arisen, based on the measured temperature parameters in the motor 21. An actuator that is connected to the control unit 24 is denoted 30. By means of the actuator, the thermal load on the motor 21 can be limited to a maximum allowable value, for example by the load on the motor 21 being limited in a suitable manner.

As an example of how to limit the thermal load on the motor 21, it is imaginable that the actuator 30 can form part of an LS system (Load-Sensing) in combination with a pump 22 with variable displacement as illustrated in FIG. 2. Moreover, for the control unit 24 a memory 31 is arranged, in which a data file with specific normative thermal reference data can be recorded in a first memory device 31a, which suitably takes place in connection with renewal of the demolition robot.

The LS system here comprises a load-sensing line LS for sensing of a pressure in connection with the consumer 13 (see FIGS. 1 and 2), whereby the control unit 24 is arranged to receive a measurement signal from the load-sensing line LS and cause the pump 22 to achieve a predetermined pressure on the load-sensing line LS so as to limit the motor's 21 load and thereby also the thermal load PT on the motor 21 to a maximum allowable thermal load value PTmax.

In an alternative embodiment, the demolition robot comprises a power-measuring second measurement means 25:2, which is coupled to a power-measuring sensing element 29. With said power-measuring second measurement means 25:2 it is possible to measure and monitor characteristics of the input power supplied to the motor from the three-phase input electric network L1, L2, L3 on site. Between the power-measuring sensing element 29 and the control unit 24, an A/D converter 32 is coupled.

FIG. 4A schematically shows a block diagram, wherein the sensing element 29 that is included in said power-measuring second measurement means 25:2 can comprise a current-sensing device with a current sensor provided for each phase of the three-phase system for sensing imbalance between the phases in the electric network or absence of any phase.

FIG. 4B schematically shows a block diagram, wherein the sensing element 29 that is included in said power-measuring second measurement means 25:2 can comprise a voltage-sensing device with a voltage sensor provided for each phase of a three-phase system for sensing imbalance between the phases in the electric network or absence of any phase.

Sensor data from said power-measuring second measurement means 25:2, generally denoted Pnät in FIGS. 4A and 4B, are transferred to the control unit 24 and compared with normative reference data stored in the memory 31, which are stored in a memory device denoted 31b, and which relates to normative input network power for the phases L1, L2, L3. These power-related data can thereby be processed in the calculation means 28 together with other thermal sensor data from the motor 21 for compilation to a data file that can be stored in the memory 31 and be presented to the operator 2. With power-related information about the network input power from said second measuring means 25:2 together with thermal data from the motor 21 via the first measurement means 25:1, it will be possible to diagnose and present a complete causal connection, i.e. "cause/effect" of potential overheating of the motor 21 of the demolition robot, whereby the operator, via the control unit 24 and the display 4c, can obtain information about the actual causal connection behind overheating of the motor, namely that overheating occurs in the motor 21 due to detected power problems in the three-phase input electric network Pnät on site, which supplies current to the demolition robot 1 via cable 12.

FIG. 1B schematically illustrates operator information, which by means of graphic user interfaces on the display unit 4c of the remote control panel describes causes and effects in case of detected thermal damage to the demolition robot, The user interface on said display unit 4c comprises a first user interface element 4c:1, which simply by means of symbols or in more detail and explicitly describes the effect to the operator 2, for example that "Risk of thermal damage is detected, and the machine therefore operates at reduced hydraulic power". Furthermore, the user interface can comprise a second user interface element 4c:2, which simply by means of symbols or in more detail and explicitly describes the cause to the operator 2, namely that "Limited power supply from the electric network is detected".

As mentioned above, the control and monitoring function 20 is adapted to control the operation of the motor 21 with information about requested hydraulic power PB to a current consumer 13 from a user (machine operator), for example via the LS function 11 and pump flow of the hydraulic system. The operator 2 can affect the deflection of a control stick 4a on the remote control device 4 at varying degrees. Major stick deflection implies that the operator 2 requests higher hydraulic output power, which implies that the motor 21 load increases correspondingly. In a common asynchronous motor, the hydraulic load results in the motor 21 working at an asynchronous rated speed. Depending on the extent to which the hydraulic load brakes the motor 21, the heat generation in the motor will vary.

The control unit 24 constitutes a computing device, comprising software adapted to control and regulate the operating temperature in the motor 21 to avoid thermal damage. As mentioned above, one or a plurality of temperature-sensing elements 26 are arranged onto the motor for temperature sensing of same via said temperature-sensing first measurement means 25:1. With information about the motor's 21 thermal load, the control unit can estimate the thermal load on the motor 21. In a user interface 4c, which can be arranged on the remote control device 4, the operator 2 can obtain information about the current thermal load on the motor 21. The lifetime of the motor 21 that is installed in the demolition robot 1 is strongly related to the thermal load PT to which it is exposed during operation. Based on experience and statistics, it is possible with good accuracy to determine how particular thermal loads PT on the motor 21 reduce its lifetime. In the following, reduction of the theoretical lifetime of the motor 21 due to thermal overloading is designated partial thermal damage S.

The partial thermal damage S can be expressed in parts of the estimated theoretical lifetime of the motor 21 at normal thermal operating conditions. For example, it can be expressed as parts of hours (h) of the motor's 21 theoretical lifetime in hours. When an accumulated partial thermal damage Σ Sn, which is due to particular thermal loads n on the motor 21, reaches the value 1.0, the theoretical lifetime of the motor 21 is obtained.

FIG. 3A shows an example of connection between partial thermal damage Sn and particular loads PTn on a motor 21. This connection is stored in the control unit 24. In this case, the particular thermal loads PTn on the motor 21 have been divided into three classes, namely PL, PM, PH. PL here corresponds to an area with low thermal load, PM corresponds to an area with medium thermal load, and PH corresponds to an area with high thermal load. In an area with lower thermal load than the one in the area PL, the thermal load on the motor 21 is so low that no partial damage Sn is deemed likely to occur. As the motor 21 is loaded thermally in the low-load area PL, a partial thermal damage appears with a value SL. As the motor 21 is loaded thermally in the medium load-area PM, a partial thermal damage appears with a value SM. As the motor 21 is loaded thermally in the area with high thermal load PL, a partial thermal damage appears with a value SH.

The diagram in FIG. 3B shows that the partial thermal damage value SN increases significantly with the motor's 21 thermal load PTn. The particular thermal load value PTn, which is used for determining the partial thermal damage SN, can be constituted by the highest load value PTn during a predetermined activation period At of the motor 21 (see also FIG. 3C). During such an activation period At, the control unit 24 is adapted to determine the thermal load area PL, PM, PH, within which the thermal load value is to be classified according to a partial damage value SL, SH, SH with the sum of previously accumulated partial thermal damage values Σ Sn.

FIGS. 3B and 3C show a curve A in the form of a straight line, which shows how the accumulated partial damage Σ Sn increases in step with the motor's operating time in hours at normative operation of the demolition robot 1 and thereby a normative distribution of the motor load in the various load areas PL, PM, PH. The motor obtains a theoretical lifetime, where the accumulated partial damage Σ Sn=1.0 i.e. in this case at an operating time of forty thousand hours annually for fifteen years, i.e. a total of approximately 60,000 hours (h), which can be considered as normal for an asynchronous motor. This operating time advantageously also corresponds to the operating time of the demolition robot 1 during a theoretical lifetime. For the motor 21 to be highly likely to obtain its theoretical lifetime D, it should not be thermally loaded more than what will be regarded as normal. To prevent the motor 21 from being loaded so much that the accumulated partial damage Σ Sn increases too quickly relative to the curve A, a limiting curve A' is used in this case. The limiting curve A' shows a maximum acceptable value of a partial thermal damage Σ Sn as a function of the motor 21 operating time in hours. This A' is intended to constitute an upper limit that particular operating points B of the motor 21 may not exceed. The difference between the curve A' and the curve A constitutes a value that determines how much the normative curve A can be overloaded, before the control unit initiates a limitation of the motor's 21 hydraulic load. However, the limiting curve A' successively approaches the normal curve A with increased operating time of the motor, so that the curves A, A' coincide, when the theoretical lifetime of the motor 21 has been reached.

During operation of the demolition robot 1, the control unit 24 is adapted to estimate current thermal operating points B for the demolition robot by means of accumulated partial thermal damage Σ Sn and information about the previous operating time D of the demolition robot 1.

FIG. 3B shows how the operating points B for a motor 21 can vary with the operating time in hours. If a current operating point B is tangent to or exceeds the limiting curve A', the control unit 24 is adapted to limit the thermal load (PT) of the motor 21 by reducing the thermal load of the motor 21, in this case by limiting the demolition robot's 1 hydraulic output power PB to the consumer 13. The control unit 24 can thereby for example be adapted to prevent the motor 21 from being thermally loaded within the high-load area PH, also if the operator 2 with the control stick on the remote control device 4 requests a hydraulic output power PB to consumers that would imply a load on the motor 21 within the thermal high-load area PH. Under such circumstances, the control unit 24 initiates a thermal load PT of the motor 21, which lies within the medium-load area PM and thereby a hydraulic output power that is lower than that the requested PB. Thereby the high partial thermal damage values SH that thermal loads PT of the motor 21 within the thermal high-load area PH give rise to are avoided. As such a limitation of the motor's 21 thermal load is introduced, the subsequent operating points B, at least after a while, end below the limiting curve A'.

In cases when the thermal load PT on the motor 21 is limited, this is indicated suitably to the operator 2 by means of the display 4c on the remote control device 4, so that the operator becomes aware that the thermal load on the motor 21 is limited. Via the display 4c, the control unit 24 can also comprise the function of warning the operator 2 that the current thermal operating points B are beginning to approach the limiting curve A'. The display 4c can also graphically show the current thermal load point B and its state relative to the curves A, A'. When the operating points fall below the limiting curve A' at a predetermined value, or when it reaches the normative curve, the limitation of the motor 21 load ceases. Thereby, the motor 21 can again be utilized within the high-load area PH. In this case, the operating points B form a curve B' that coincides with the curves A, A', as the theoretical lifetime of the motor 21 has been reached.

FIG. 5 shows a flow chart, describing a method according to the invention. At step 35, the process starts.

At step 36, the control unit 24 receives a request for the desired hydraulic power PB to a current consumer 13 from the operator, for example via the LS function of the hydraulic system. At step 37, the control unit 24 determines the current thermal operating point B for the motor. At step 38, the control unit 24 compares whether the thermal operating point B is tangent to or lies above the thermally limiting curve A'. If that is not the case, the control unit 24 does not initiate limitation of the thermal load on PT on the motor 21, and the current consumer 13 is, at step 39, given the requested hydraulic power PB.

Subsequently, the control unit 24 establishes, at step 40, whether the thermal load PT on the motor is a particular thermal load value PTn that is to be used for estimating a partial thermal damage S. Such particular thermal load value PTn for determination of partial thermal damage can thus be constituted by a maximum thermal load value PT within an activation period At of the motor 21. If the load PT is not deemed to be such a single load value PTn, the process begins anew from the start without any partial thermal damage S being registered.

However, if the thermal load value PT constitutes a partial damage-determining thermal load value PTn, it is estimated at step 41 within which load area PL, PM, PH the thermal load value PTn lies, see FIG. 2. Subsequently, at step 41, the partial thermal damage SL, SM, SH corresponding to the thermal load value PTn is determined. This value SL, SM, SH thereby constitutes the partial thermal damage Sn for the thermal load value PTn. At step 42, the partial thermal damage Sn is added to previously accumulated partial thermal damage Σ Sn, so that a new value of the accumulated partial thermal damage Σ Sn is obtained. Thereafter the process begins anew from the start.

If the control unit 24, at step 38, instead establishes that the thermal operating point B is tangent to or lies above the limiting curve A' (see the encircled area in FIG. 3), the control unit 24 is adapted to limit the thermal load PT on the motor 21. The control unit 24 thereby determines, at step 43, a maximum thermal value PTmax that is the highest allowable load of the motor 21. The control unit 24 can for example limit the thermal load PTmax on the motor to the value PM, which prevents the motor 21 from being loaded within the thermal high-temperature area PH. The control unit 24 can also, at step 43, through hydraulic flow limitation determine the hydraulic power Pmax that the consumer 13 can obtain with the maximum allowable thermal load PTmax on the motor 21. At step 44, the control unit 24 determines whether the hydraulic power PB requested by the operator 2 to the consumer is equal to or lower than the maximum allowable hydraulic power Pmax.

If that is the case, it means that the requested hydraulic power PB can be allowed, and the motor be loaded, at step 39, with the thermal load PT, which is thus lower than the maximum allowable thermal load on the motor PTmax. Thereafter the process continues with step 40 and optionally steps 41 and 42 in a corresponding manner as described above.

If the control unit 24, at step 44, instead establishes that the operator requests a hydraulic power PB that is larger than the maximum allowable hydraulic output power Pmax, the control unit 24 is adapted to limit the hydraulic power to the maximum allowable hydraulic power Pmax. Thereby the control unit 24 limits the thermal load PT on the motor 21, at step 45, to the maximum allowable thermal load value PTmax. Thereafter the process continues with step 40 and optionally steps 41 and 42 in a corresponding manner as described above.

If, at step 46, the control unit establishes that the power of the current input network is lower than a normative value on the electric input network Pnätn, the operator 2 is warned about this and about problems with current supply to the motor 21, at step 47. If Pnät is not deemed to be lower than Pnätn, the process starts again at step 35.

If, at step 41, the thermal load value PT is deemed to constitute a partial damage-determining thermal load value PTn, the operator 2 is warned of this, at step 48, and further that the maximum allowable hydraulic output power Pmax is limited.

As appears from the above description of the invention, the lifetime of the motor depends on its thermal load during operation. In the demolition robot according to the invention, a control and monitoring function is included, preventing the demolition robot from being used in a manner that may result in thermal damage to the electric motor of the demolition robot. Through power regulation of the power of the hydraulic flow that is supplied to the consumers of the demolition robot, the motor temperature can be controlled and monitored, whereby the risk of thermal damage can be minimized, and by means of such adaptation and operating limitation, the motor can obtain the same lifetime as the demolition robot overall.

As the demolition robot, according to the invention, comprises means that are adapted to inform an operator not only about the effect of a causal connection, i.e. that the demolition robot can only work at limited hydraulic output power due to detected risk of thermal damage, but also about the actual causal connection, such as a control of the quality of the electric power supplying the motor with energy, the operator becomes aware of an entire causal connection. Thereby the operator can submit substantially more detailed information to a technician to solve the actual problem of overheating of the motor, because the actual problem can comprise failure due to absence of any phase in the electric three-phase network on site.

What is claimed is:

1. A demolition robot, comprising,
   a cable for energy supply to an electric motor comprised in a demolition robot, wherein said cable is intended to be connected to an electric three-phase network on site,
   a pump that is powered by the electric motor for generating a hydraulic flow to
   each consumer comprised in or connected to the demolition robot, wherein the motor
   is activable with varying thermal load values that depend on current consumer's need for hydraulic power,
   one or a plurality of measurement means,
   a control unit arranged to receive information about the thermal load on the motor from each measurement means, determining one or a plurality of
   different partial thermal damage values that are configured to arise on the motor at different thermal loads on the motor, wherein:
   the control unit is adapted to compare one or a plurality of the partial thermal damage values with a normative partial thermal damage, and via an actuator comprised in the demolition robot adapted to limit the thermal load on the motor to a maximum allowable thermal load value, if one or a plurality of the partial thermal damage values exceed the normative partial thermal damage by a predetermined value.

2. The demolition robot according to claim 1, wherein said measurement means comprise one or a plurality of temperature-sensing first measurement means arranged for the electric motor for sensing the motor's operating temperature, wherein the control unit can determine the thermal load on the motor by receiving information from said measurement means.

3. The demolition robot according to claim 1, wherein the control unit is connected to stored information that enables estimation of extent of the partial thermal damage caused by different thermal load values on the electric motor.

4. The demolition robot according to claim 1, wherein the thermal load values on the electric motor can be divided into at least two different thermal load areas, and each of the load areas has a corresponding partial thermal damage value.

5. The demolition robot according to claim 1, comprising an indication means, which is adapted to inform an operator of the demolition robot in cases when the electric motor can only be activated up to a maximum allowable thermal load value, until the electric motor again has reached a normative operating temperature.

6. The demolition robot according to claim 5, wherein the indication means comprises a first user interface element configured to show information about thermal operating condition of the electric motor to an operator.

7. The demolition robot according to claim 1, comprising an LS system with a load-sensing line for sensing a pressure in connection with each current consumer, wherein the control unit is arranged to receive a measuring signal from the load-sensing line and via the actuator is arranged to cause the pump to achieve a predetermined pressure on the load-sensing line to limit the thermal load on the electric motor to a maximum allowable thermal load value.

8. The demolition robot according to claim 1, wherein said measurement means comprise a power-sensing second measurement means to sense the power of the current supplied from the three-phase network to which the demolition robot is connected via the cable.

9. The demolition robot according to claim 8, wherein the control unit is connected to stored information, making it possible to compare the sensed power of the current supplied from the three-phase network with a normative power value.

10. The demolition robot according to claim 5,
wherein said measurement means comprise a power-sensing second measurement means to sense the power of the current supplied from the three-phase network to which the demolition robot is connected via the cable, and
wherein the indication means comprises a second user interface element configured to show information about deviations between the power of the current supplied from the three-phase network and the normative power value to an operator.

* * * * *